United States Patent [19]

Medal

[11] Patent Number: 5,697,744
[45] Date of Patent: Dec. 16, 1997

[54] METHOD AND INSERT FOR CONNECTING COMPONENTS TO PLASTIC MEMBERS

[75] Inventor: James Medal, Cape Coral, Fla.

[73] Assignee: Unimation, Inc., Ft. Myers, Fla.

[21] Appl. No.: 773,399

[22] Filed: Dec. 26, 1996

Related U.S. Application Data

[63] Continuation of Ser. No. 390,854, Feb. 17, 1995, abandoned, which is a continuation-in-part of Ser. No. 84,699, Jun. 29, 1993, Pat. No. 5,391,031, which is a continuation-in-part of Ser. No. 887,722, May 22, 1992, Pat. No. 5,222,850.

[51] Int. Cl.⁶ ............................. F16B 37/04; F16B 39/02
[52] U.S. Cl. ..................... 411/82; 411/171; 411/180; 411/258; 156/73.1
[58] Field of Search ........................ 411/82, 171, 178, 411/180, 258, 427; 285/21, 915; 156/73.1

[56] References Cited

U.S. PATENT DOCUMENTS

| | | | |
|---|---|---|---|
| 3,278,356 | 10/1966 | Katz | 156/294 |
| 3,403,718 | 10/1968 | Hughes | 411/180 |
| 3,661,661 | 5/1972 | Berleyoung | . |
| 3,819,437 | 6/1974 | Paine | 156/73 |
| 4,169,751 | 10/1979 | Yen | 156/73.1 |
| 4,211,923 | 7/1980 | Fukuyama et al. | 250/239 |
| 4,230,757 | 10/1980 | Toner | 428/137 |
| 4,293,359 | 10/1981 | Jakobsen | 156/156 |
| 4,326,902 | 4/1982 | Peddie | 156/73.1 |
| 4,368,826 | 1/1983 | Thompson | 215/100 A |
| 4,564,932 | 1/1986 | Langé | 369/286 |
| 4,618,516 | 10/1986 | Sager | 428/35 |
| 4,626,308 | 12/1986 | Ansell | 285/21 |
| 4,767,492 | 8/1988 | Fukusima et al. | 156/580.2 |
| 4,834,819 | 5/1989 | Todo et al. | 156/73.1 |
| 4,842,462 | 6/1989 | Tildesley | 411/180 |
| 4,906,313 | 3/1990 | Hill | 285/21 |
| 4,927,183 | 5/1990 | Steinmetz et al. | 285/21 |
| 4,931,114 | 6/1990 | Sliva | 156/73.1 |
| 4,938,314 | 7/1990 | Sitzler et al. | 411/180 |
| 4,941,788 | 7/1990 | Highfield | 411/180 |
| 5,040,357 | 8/1991 | Ingemann | 53/478 |
| 5,269,917 | 12/1993 | Stankowski | 210/232 |
| 5,316,603 | 5/1994 | Akazawa et al. | 156/69 |
| 5,401,342 | 3/1995 | Vincent et al. | 156/73.1 |
| 5,403,415 | 4/1995 | Schembri | 156/73.1 |
| 5,435,863 | 7/1995 | Frantz | 156/64 |

FOREIGN PATENT DOCUMENTS

| | | | |
|---|---|---|---|
| 2461142 | 3/1981 | France | 411/180 |
| 3209920 | 9/1983 | Germany | 411/180 |
| 55-121024 | 9/1980 | Japan | . |
| 2 088 986 | 10/1981 | United Kingdom | . |

*Primary Examiner*—Neill R. Wilson
*Attorney, Agent, or Firm*—Fitch, Even, Tabin & Flannery

[57] ABSTRACT

A method and apparatus are disclosed for joining a plastic insert or component to a plastic base having a recess therein. The component is provided with integral projections thereon that are separated from one another by spaces. The component is inserted into the recess with the projections force-fitted against the plastic base. The plastic of projections is caused to flow into the spaces, and the plastic of the base is caused to flow into the spaces where the plastics are intermixed. Then, the flowed, intermixed plastics are brought back into a solid condition with spaces now filled with solid, intermixed plastics that interlock the components to the base against rotation relative to one another and to prevent them from being pulled apart. The preferred projections are spaced in rows and have inclined sidewalls extending outwardly to small, cross-sectional, free ends for rapidly melting and flowing into the spaces. The projections lose their shape and identity, and there is preferably no line of demarcation at the location of the former spaces between the component and plastic base.

6 Claims, 3 Drawing Sheets

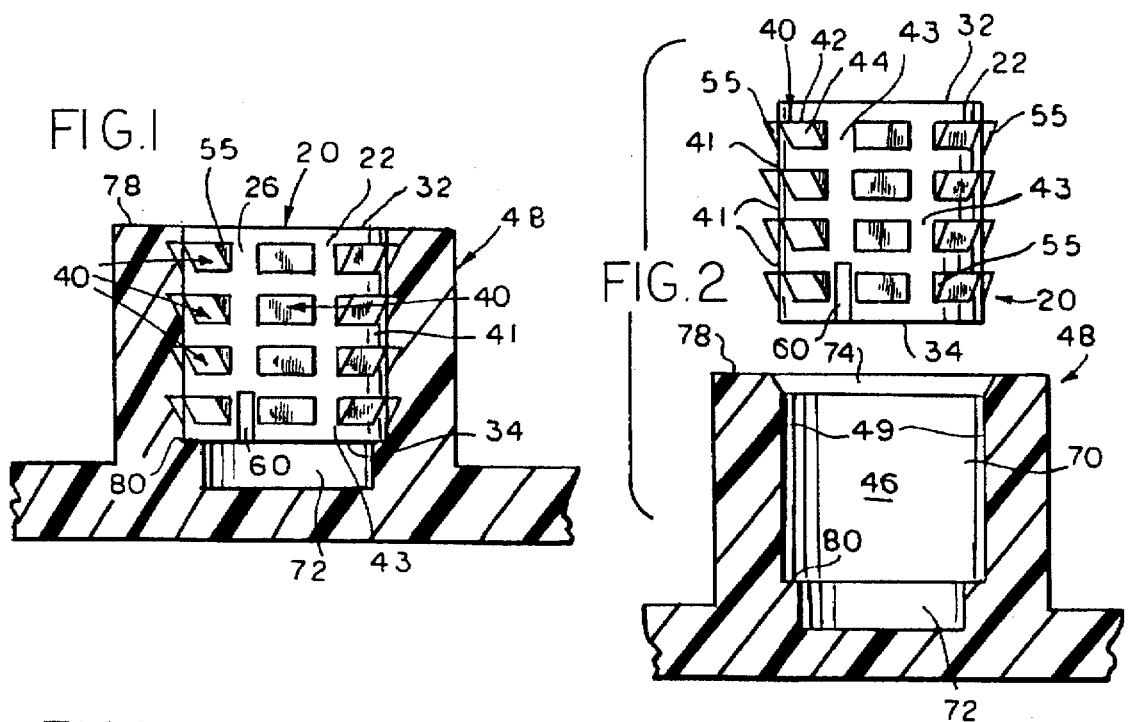
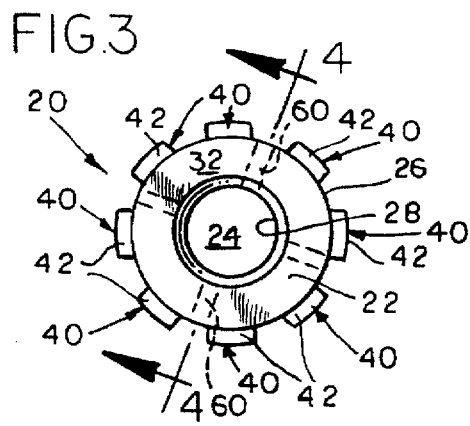
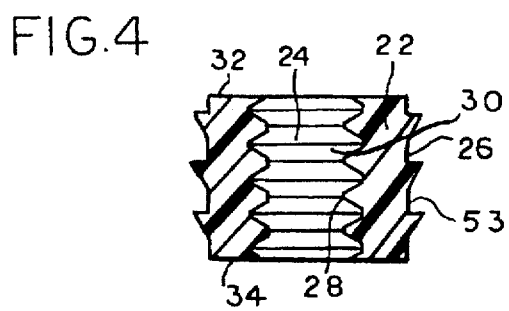
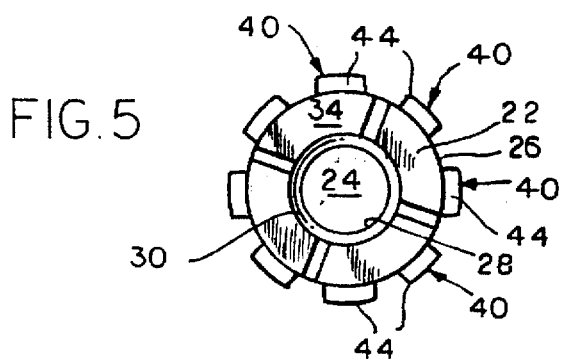

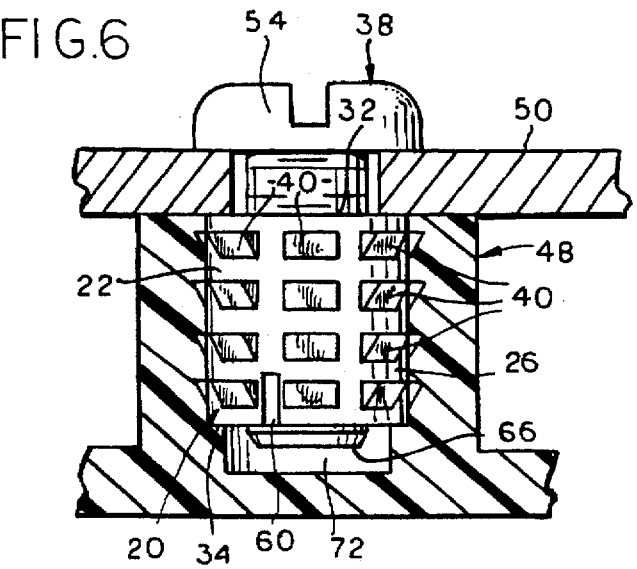
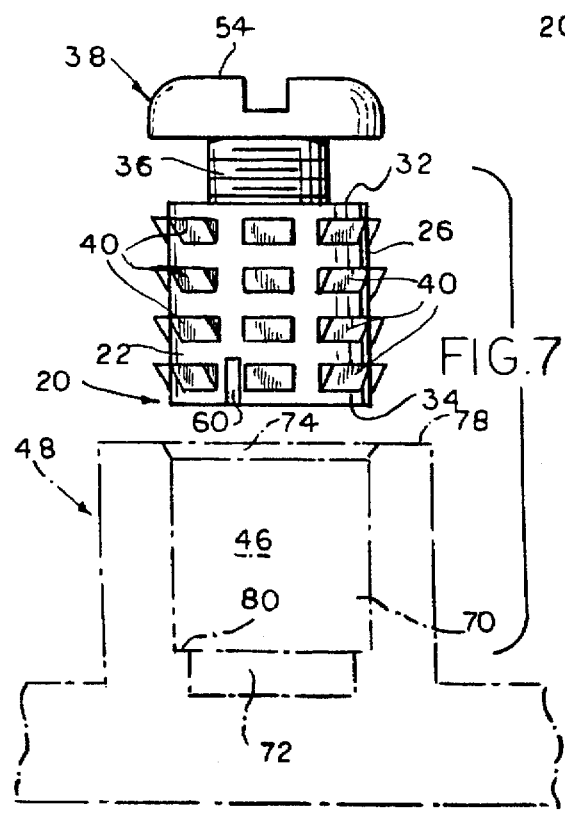
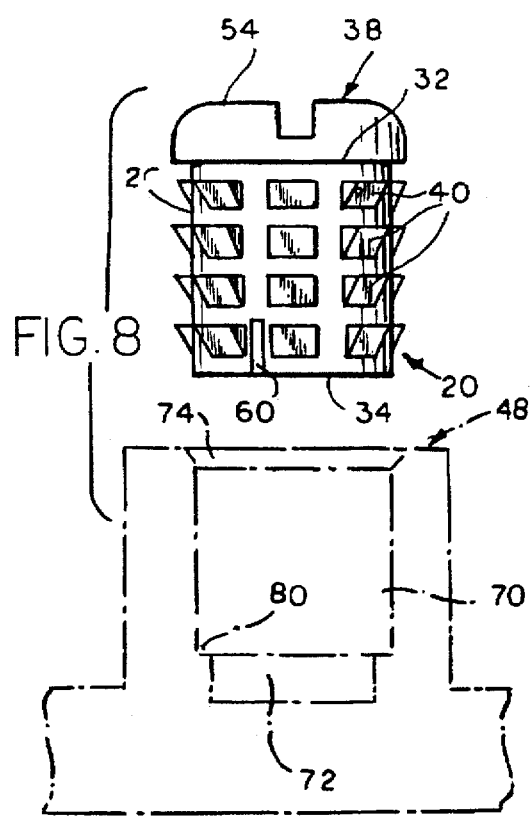

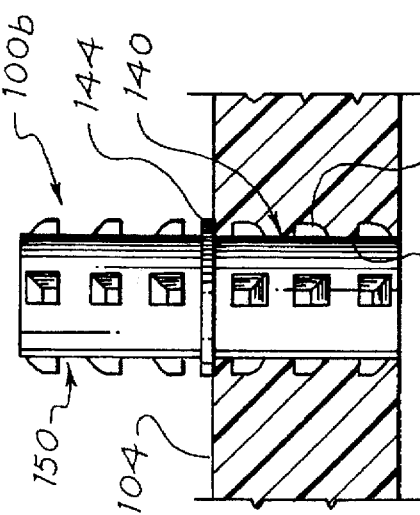
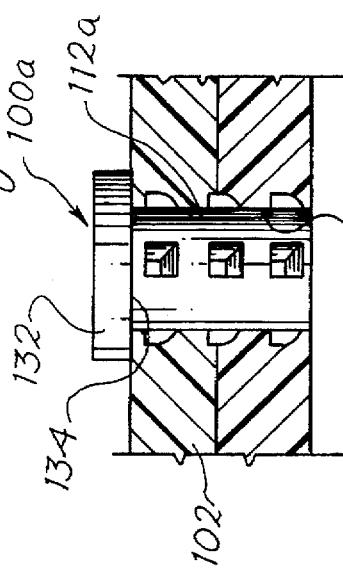
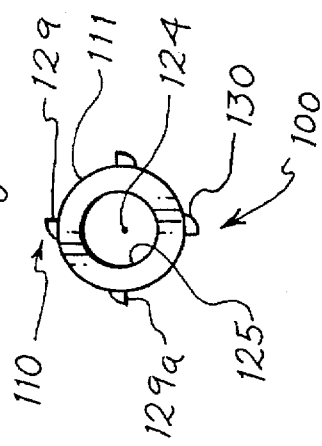
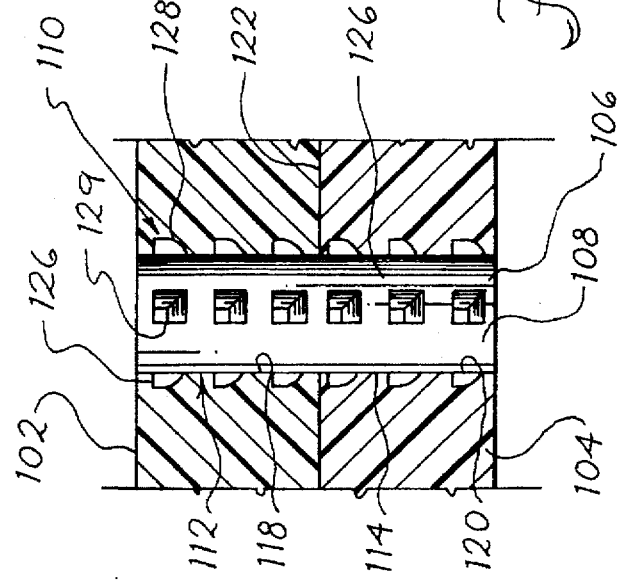
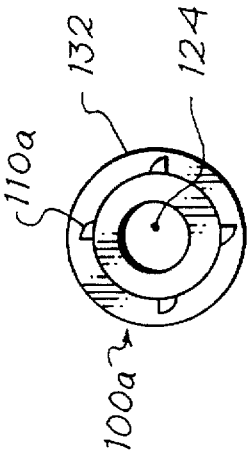
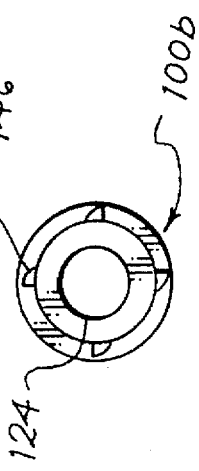

METHOD AND INSERT FOR CONNECTING COMPONENTS TO PLASTIC MEMBERS

FIELD OF THE INVENTION

This application is a continuation of application Ser. No. 08/390,854 filed Feb. 17, 1995 now abandoned, which is a Continuation-In-Part application of application Ser. No. 084,699 filed Jun. 29, 1993, now U.S. Pat. No. 5,391,031, which, in turn, a Continuation-In-Part application of application Ser. No. 887,722 filed May 22, 1992, now U.S. Pat. No. 5,222,850.

BACKGROUND OF THE INVENTION

Molded plastic parts have become increasingly popular, due at least in significant part to their low production cost. Hence, often, one or more components of an assembly are formed of molded plastic. In assembling a final product it is often necessary to fasten the molded plastic parts to other components to produce the final product.

Current production methods for fastening components to a plastic part of low ductility include forming a threaded recess in the plastic part, which serves as a base, and into which a threaded member or fastener is screwed. This has been found to be undesirable in several respects. The brittle nature of polycarbon and other plastics employed makes it difficult to cut threads in the polycarbon base for receiving the threaded member. During thread formation, the brittle polycarbon base material has been found to crack and chip, often making insertion of the threaded fastener difficult or impossible. Also, the chipping reduces the bearing surface area against which the threads of the fastener bear against the base to preclude the fastener from being pulled out of the base. Thus, the load bearing capacity of the threaded member is significantly reduced.

Due to the aforementioned difficulties associated with pre-threading brittle plastic base materials, other, less desirable, fastening means have been employed. One such alternative fastening means attempted has been to employ a self-threading screw. However, the brittle nature of the plastic base material precludes the formation of a consistent thread therein, with a resultant cracking of the base.

Alternatively, internally threaded metal inserts have been molded to the base, with the threaded fastener then screwed into the internal threads of the metal insert. However, due to the inherent incompatibility of metals and plastics, the bond therebetween has been found inadequate to maintain bonding of the metal insert to the plastic base when the metal insert is pulled with significant force. Bonding of the metal insert is attained by providing the metal insert with grooves, ridges or knurls and bringing the base plastic to a flowable state whereby the base plastic flows into the grooves, ridges or knurls of the insert. Accordingly, the strength of the bond is only derived from the base plastic, and limited thereby. Hence, upon imposition of significant forces pulling on the metal insert, the insert is pulled from the base, together with any threaded member screwed into the insert. Additionally, formation of the metal inserts adds considerable expense to the overall production cost.

One method currently employed for fastening components to the base which provides the desired bonding strength is a conventional screw and nut assembly. However, this is undesirable in several respects. Functionally, the screw and nut assembly loosens over time, resulting in a loose connection between components. Also, aesthetically, screw and nut assemblies are undesirable due to the requirement of a provision for accommodating the nut or the nut being exposed on one end of the base, rather than allowing for employment of a blind tapping which provides superior aesthetics. Furthermore, the requirement of the metal nut adds undesirable cost to production.

There is a need for eliminating the driving of a metal fastener into the plastic base. This operation of driving the metal fastener requires assembly time and the use of labor. Overall production efficiency could be obtained by eliminating a tapping of a thread into a plastic base and/or the driving of a fastener into the thread in the plastic base. In its preferred form the invention allows elimination of the driving of the fastener into the plastic base thereby increasing overall efficiency in mounting components to a plastic base with a metal threaded fastener.

Also, there is a need to join together plastic bodies such as two plastic components or a pair of plastic sheets or plates with one or more plastic fasteners. While metal fasteners may be used as above-described, there are times when it is desired not to use metal and still join plastic parts or components together to form a composite of the two joined parts. In such instances, it is preferred that the plastic fastener form a strong, secure connection that will not readily loosen as may a plastic screw that is threaded into the parts to join them together. Preferably, the plastic fastener should bond the two plastic bodies together much in the manner that of an integral bond therebetween.

The present invention is also of particular use to molders of plastic parts, such as molded plastic shells or molded plastic bodies that have cylindrical protrusions or bosses thereon to create an attachment area for a screw or other fastening means to secure one body to another body or to a supporting frame, or to attach other elements to the molded plastic body. For example, in the automotive industry, dashboards are molded from plastic with an exterior shell that has the same outside appearance but on the inside, has different bosses to receive screws or other fasteners to secure different instruments which vary depending on the model and/or the instrument options selected by the purchaser. Currently, the automotive company and the molder have one mold for each of the options; and this may result in twenty or more molds to accommodate each internal change of the bosses or reinforcing thick portions on the plastic shell body which has the same outward appearance.

The injection molding of these thick portions or bosses is a time-limiting factor on the molding process because the time needed for the plastic to solidify before part ejection is usually determined by the thickness of the plastic cross-section, and it takes longer to solidify the thicker bosses than the thin shell cross-section.

Also, in a mold, the boss configuration is the highest wear part of the molding die. A pin which is commonly called a core pin is inserted in the center of the boss to create an attachment area for a screw or other method of attaching the shell. This pin is nominally tapered and must be closely controlled because of the amount of pressure and friction the pin must withstand. The pin is normally the highest wear point of the mold and requires the most rework and replacement.

Additionally, strength requirement for the boss may determine what plastic is used for the shell because the strength needed for the bosses used for affixing the shell to another shell or to another part or frame or to mount other elements may outweigh other considerations. That is, the product may be molded with more or larger bosses or higher strength plastic materials than the shell requires in order to provide the strength to the bosses to interconnect the shell with other parts. Additionally, some products that are now molded with integral plastic bosses, e.g., integrated circuit boards or the like, could be made less expensively from plastic flat sheet stock with subsequently attached bosses.

From the foregoing, it will be seen that there is a need for a new and improved method for forming plastic products with integrally attached plastic projections such as bosses.

SUMMARY OF THE INVENTION

In accordance with the present invention, molders of plastic articles will need fewer molds or may operate at a faster molding cycle because projections or bosses may be added later and integrally joined to the article with an intermixing of the plastics of the respective articles and the joined projection or boss. The preferred method comprises the molding of a body or shell and providing holes or wall-defining recesses in the body or shell. The holes or recesses have a predetermined size and shape that is matched by the size and shape of the connecting end of a boss, which is inserted into the hole or recess. The engaged boss and the shell wall defining the recess are brought to a flowable state, e.g., by an ultrasonic welding horn and/or a liquid bonding agent, and then respective plastic materials are intermixed and then solidified to form an integral plastic bond between the boss and the shell.

Of particular advantage is the manufacture of the shells of a different plastic material, e.g., low-cost or lower strength plastic, than the higher strength and more costly material used for the bosses. The base material of the shell can be manufactured from a lesser expensive molding compound and the insertible boss can be manufactured with a higher grade compound and ultrasonically molded to the shell. This would give the boss the added strength and eliminate the high cost material from the shell. For example, if a product weighs 1.50 lbs. in its molded state and the cost of the molding compound is $1.80 per pound, this results in a total cost of $2.70 per unit. The amount of material used in weight in the bosses is 0.20 lbs., or $0.36 of the total cost; to keep the strength, we manufacture the transferable boss from the same material and reduce the grade of material to a compatible grade but at a cost of $0.90 per pound, or a total cost of the shell with insertible boss of $1.53. This would give a savings of $1.17 per unit in material cost. Also, by using high grade material, a filler of glass, fiber, or other compounds, the plastic for the boss may be given added strength. These added materials normally reduce the ductility of the molded shell and reduce the impact strength of the overall shell. In many instances, this would be an improvement by gaining impact on the outer surface of the shell plus torsional strength on the holding fixtures.

Because the thick boss portions no longer are present on the mold part, the cycle time for the molding press may be decreased.

The present invention also allows cheaper manufacture of some articles because flat plastic sheet stock may be provided within the walls defining the recesses; and the bosses may be inserted therein, the plastics of the boss and sheet stock flowed together and intermixed, and then solidified to provide an integral interconnection of mixed plastic between the bosses and the plastic sheet. Also, the insertible boss will give an option of using other fusible methods of creating a plastic steel, as in plastic extrusion, which creates a shape by forcing the plastic compound through a die. This method is very economical but at the present time, is only used to create simple shapes because it is continuous and cannot form protrusions. The insertible boss can be integrally joined to plastic extrusions which would now open an economical high volume, low-cost method of producing a part which could be assembled with other components or to another plastic member.

Preferably, the plastic bosses are formed on their connecting ends with a plurality of small protrusions which liquify and flow and become so integrated with the plastic body that a cut through the plastic boss and body fails to reveal the protrusions or a line of demarcation between the boss and the body, particularly where the same plastic is used for the boss and the body.

A preferred manner of achieving the flowable state is the use of ultrasound to heat the respective plastics to a flowable state at the interface therebetween with the small protrusions rapidly melting and flowing into molten plastic from the adjacent bore wall. The force-fit or compression at the points of the protrusions against the bore wall in the body assists in causing the protrusions to flow into the space between adjacent protrusions and losing their shape and identity.

Another preferred manner of joining the boss to a plastic body is by use of a bonding agent such as an acetone, a liquid cyanoacrylate ester, or the like that liquifies the plastic of two abut pieces under pressure or compression.

BRIEF DESCRIPTION OF THE DRAWINGS

In the drawings, wherein like elements are referenced alike:

FIG. 1 is a side elevational view of an insert embodying various features of the present invention, shown inserted into a base recess, with the base in cross-section;

FIG. 2 is a side elevational view of the insert and cross-sectional view of the base recess of FIG. 1, shown here with the insert spaced above the base recess;

FIG. 3 is a plan view of the insert of FIG. 1;

FIG. 4 is a cross-sectional view of the insert of FIG. 1, taken along line 4—4 of FIG. 3;

FIG. 5 is a bottom view of the insert of FIG. 1;

FIG. 6 is a side elevational view of an insert inserted into a base recess, with a threaded member extending through an aperture in a component and received in the insert to fasten the component to the base;

FIG. 7 is a side elevational view of an insert having a threaded member partially inserted therein, shown spaced above a base recess which is shown in phantom;

FIG. 8 is a side elevational view of an insert having a threaded member fully inserted therein, shown spaced above a base recess which is shown in phantom;

FIG. 9 is a plan view of a plastic fastener constructed in accordance with the invention;

FIG. 10 is a side elevational view of the plastic fastener of FIG. 9;

FIG. 11 is a side elevational view of a plastic fastener having a head and constructed in accordance with another embodiment of the invention;

FIG. 12 is a plan view of the plastic fastener of FIG. 11;

FIG. 13 is a side elevational view of a plastic fastener having a central collar and constructed in accordance with another embodiment of the invention; and FIG. 14 is a plan view of the plastic fastener of FIG. 13.

DETAILED DESCRIPTION OF THE PREFERRED EMBODIMENTS

As shown in the drawings for purposes of illustration, the invention is embodied in a plastic large base, or body 48, to which is joined a smaller plastic projection or piece which is described as insert 20 in the embodiment of FIGS. 1–8, described as a fastener 100 in the embodiment of FIGS. 9–14 and as a boss; and described as a boss in the embodiment of FIGS. 15–20.

Referring now to the embodiment of FIGS. 1–8, the insert 20 comprises a body 22 formed into the shape of a right circular cylinder and having an axially extending hollow interior bore or passageway 24 therethrough. The body 22 defines an exterior surface 26 and interior surface 28. The interior surface 28 is formed having threads 30 therein, extending the length of the insert 20 from its upper end, 32 to its lower end 34. The internal threads 30 of the insert 20 are formed to correspond to the threads 36 of the screw or threaded member 38 (see FIG. 7) to allow the threaded member 38 to be screwed into the insert 20 and threadably engage therewith. This is discussed further, below.

A plurality of protrusions 40 are formed integrally with the insert body 22 and extend radially outward from the exterior surface 26 of the insert 20. The projections 40 are preferably wedge-shaped as shown in the drawings, having a flat, generally horizontal upper end 42 and angled lower side or portion 44. The projections 40 are arranged in vertical rows with projections spaced by vertical spaces or gaps 41 (FIG. 2) from one another within a row. The rows are spaced angularly in a circumference direction by spaces 43 between adjacent rows or projections.

The cylindrical recess 46 in the base is formed having a diameter larger than the outer diameter of the insert body 22, but smaller than the diameter defined by the outer tips of projections 40. The angled portion 44 of the wedge shaped projections 40 serves as a camming or bearing surface upon force-fit insertion of the insert 22 into a cylindrical recess 46 of a plastic base 48. Thereby, the projections 40 deflect or deform slightly during insertion of the insert 20 into the recess 46 of the base 48 so that the insert 22 is wedged in a stationary position inside the base recess 46.

Depending upon the type of plastic material selected for the insert 20 and base 48, the projections 40 of the insert 20 may burrow into the plastic of the base 48 as illustrated in the drawings, or may only scratch the wall of the base recess 46 upon insertion without digging significantly into the base material. Either way, the insert 20 remains in a stationary position by force-fit insertion within the base recess 46, with the interior threads 30 of the insert remaining intact.

After the insert 20 has been fully inserted into the recess 46, the insert 20 and base 48 are brought to a flowable state at their interface, by ultrasound or other suitable technique. Thereby, the plastic of the projections 40 flows with the plastic of the base 48 into the spaces 43 and gaps 41 about the projections 40 and plastic of the base also melts and flows into these gaps and spaces. It will be appreciated that plastic melting and flowing to rest on the upper ends 42 of the projections 40 or melting and combining with the plastic of the upper ends 42 of the projections provides a good strong barrier to upward pulling forces tending to pull the insert from the base. The plastic melting and flow into the circumferential spaces 43 between adjacent rows of projections will resist angular torque loads trying to turn or to rotate the insert in the base recess 46. That is, plastic from the internal recess wall 49 of the base and plastic from outer circumferential wall 53 (FIG. 4) as well as from outer surfaces of the projections 40 melts and flows together so that triangular shaped, vertical sides 55 on the projections abut against this melted and reformed plastic when a turning torque tries to turn the insert in the base. This creates a region of blended plastics immediately surrounding the body 22 of the insert 20. Upon cooling, the plastics solidify, with the insert 20 integrally bonded with the base 48. The interior threads 30 of the insert 20 remain intact throughout the ultrasound and cooling operations, whereby upon screwing of a threaded member 38 into the insert 20, the threads 36 of the threaded member 38 engage with the threads 30 of the insert 20 to secure the threaded member 38 within the insert 20.

Hence, the insert 20 bonds integrally with the base 48 about the exterior of the insert 20, with the interior threading 30 of the insert 20 providing a site for threaded engagement of a screw or other threaded member 38. With brief reference to FIG. 6, to attach a component 50, which may be a metal, plastic, or any other material, to the base 48, an insert is bonded integrally to the base 48 in the aforementioned manner, and then a screw or other threaded member 38 is passed through an aperture 52 in the component 50 and screwed into the threaded interior of the insert 20. The component 50 is thus secured between the base 48 and the head 54 of the screw 38.

In accordance with one aspect of the invention, the insert 20 may include a filler of glass, metal or the like. The filler flows or migrates together with the plastics of the insert 20 and base 48 to provide increased strength to the blended region surrounding the insert 20. The filler results in greater strength because it is melted into the gaps 41 between projections and spaces 43 between rows of projections and fills at least partially these spaces and gaps and because it is at the bonding points between the insert 20 and base 48.

In accordance with another aspect of the present invention, the insert 20 has a plurality of slots 60 at its lower end 34. When brought to a flowable state, the overflow of the plastics of the base 48 and insert 20, together with any fillers, migrate into the slots 60. Upon cooling, this provides additional bonding of the insert 20 to the base 48, with small portions of plastic integral with the base 48 extending through the slots 60 to further retain the insert 20 in a stationary position. The material in the slots particularly resists turning torques trying to rotate the insert in the base. The threaded member 38 may be short and extend only part way into the insert 20, or may be long and extend completely through the insert 20. With employment of screws or other threaded members 38 which are long enough to extend down to the slots 60, the slots 60 also serve to provide locking of the screw or other threaded member 38. Plastic flowing through the slots 60 contacts the lower end 66 of the threaded member 38, and when that plastic hardens it bears against the threaded member 38 in place, resisting rotation of the screw in the insert. If the screw 38 is already threaded into the insert at the time of plastic flow within the slots, the plastic flows against the threads and acts as an inhibitor to turning of the screw. If no screw is present at the time of plastic flow into and through the slot 60, then the screw will cut a thread into this plastic flow now projecting into the hollow bore 24 when the screw is fully threaded into the insert. The plastic in the slot and engaging the screw acts to retard any unscrewing of the screw as by vibration.

As stated previously, the present invention is particularly directed to, in its preferred embodiment, to providing a fastener 38 preassembled into the insert thereby eliminating the usual time consuming and expensive assembly operation of aligning a fastener with a threaded bore and then turning the fastener into the threaded bore. In some instances, the screw may be a self tapping screw; but nonetheless a driving operation is required. Labor can be reduced and overall efficiency can be improved by either molding the insert plastic material around the fastener 38 to provide a preassembled insert and fastener combination or by selling to a user the preassembly of the insert 26 and fastener 38 so that the fastener threading is eliminated at the place of usage of the preassembled fastener and insert assembly. A better and tighter fastener fit in the insert is obtained by molding the insert about a threaded fastener inserted into plastic mold. The plastic will fill and conform to any irregularities in the screw thread thereby resisting a turning of the screw thread in the removal direction. It will be appreciated that, where the screw thread is formed in the insert, prior to assembling the fastener therein, the tightness of the joinder of the component 50 to the base 48 is limited by the tolerances between the threads 36 of the screw 38 and the threads 30 of the insert 20. When the insert 20 is molded together with and about a threaded member 38, a perfect thread match is realized between the threads 36 of the screw or other threaded member 38 and the threads 30 of the insert 20. The threaded member 38 may be coated with a high temperature lubricant to create a barrier between the plastic insert 20 and the metal threaded member 38, to allow the threaded member 38 to rotate freely following cooling of the freshly molded insert 20.

Thus, in this embodiment, a one-piece assembly is produced, such as that illustrated in FIG. 8, having a threaded member 38 residing within an insert 20 which has been formed about the threaded member. The threads 36 of the threaded member 38 define the threads 30 of the insert 20, so that an optimal engagement therebetween is realized. The threaded-fastener-and-insert-assembly is insertible as an assembly into a corresponding recess 46 of the base 48, and bonded to the base in the aforementioned manner.

The insert 20 may be bonded to the base 48 by molding during formation of the base 48, or may be bonded to the base 48 by ultrasound after the base 48 has already been formed. This is an important feature of the invention, in that significant cost savings are realized by the ability to provide the base with a site for threaded engagement during formation of the base, rather than having to bond the insert to the base in a post-molding operation.

Bonding of the insert 20 to the base 48 during the formation of the base 48 eliminates the previously-required additional production step of first forming a base 48 having a recess 46 and then, later, affixing an insert 20 within the recess 46. By molding the insert 20 to the base 48 during formation of the base 48, significant cost savings in production are realized.

The insert 20 of the present invention also lends itself to use with attaching components to a soft, pliable base 48. The compatible, higher strength insert 20 is bonded to the soft, pliable base 48 by bringing the plastics of the insert 20 and base 48 to a flowable condition at their interface, as discussed above. The higher strength plastic of the insert 20 blends with the lower strength plastic of the base 48 to provide increased material strength for securing a threaded member 38 thereat. Accordingly, the insert 20 expands the use of such softer plastics.

The recess 46 formed in the base 48 preferably has a configuration such as that shown in FIGS. 2, 7 and 8. The illustrated recess 46 comprises two concentric cylindrical sections; intermediate section 70 of a diameter corresponding to the diameter of the insert 20, and lower section 72 of reduced diameter. The uppermost portion 74 of the recess 46 tapers outwardly or is chamfered, to provide an angled bearing surface for the projections 40 to bear against during initial insertion of the insert 20 into the recess 46. The chamfered upper end portion 74 also allows the upper end 32 of the insert 20 to lie below the plane of the upper end 78 of the portion of the base 48 surrounding the recess 46.

The provision of the reduced diameter at the lower portion 72 of the recess 46 serves as a stop to define the extent of insertion of the insert 20 by abutment of the lower end 34 of the insert 20 against the ledge 80 at the step-down. The lower portion 72 also receives any excess overflow material from the insert bonding operation. Additionally, the lower portion 72 also allows for the use of screws 38 which are longer than the insert 20, with the leading end 66 of the screw 38 extending beyond the lower end 34 of the insert 20 and being received within the lower portion 72 of the recess 46. In this manner, the same inserts 20 may be employed with varying lengths of screws 38 with the depth of the lower portion 72 being varied in relation to the length of screw 38 being employed.

Referring now to the embodiment of the invention shown in FIGS. 9 and 10, the invention is shown in a second plastic piece that is both an insert, as described in the embodiments of FIGS. 1–8; and is a boss, as described in the embodiment of FIGS. 9–14. The fastener 100 has a plastic fastener 100. The fastener 100 has an integral, one-piece fastener body 106 formed of plastic having an outer, exterior wall 108 from which project a number of protrusions or projections 110. The illustrated fastener is formed with a cylindrical shape but it can be made of other shapes for example, polygonal, and still fall within the purview of the invention. The two bodies 102 and 104 to be joined together by the plastic fastener are first drilled to have aligned holes or openings 112 and 114 therein sized to have a force fit with the projections 110 on the exterior wall of the plastic fastener. Manifestly, the holes 112 and 114 could be preformed at the time of molding of the plastic bodies 102 and 104.

The preferred manner of securing the bodies 102 and 104 with the plastic fastener 100 is to coat the exterior fastener wall 108 and projections 110 with a liquid bonding agent as by an applicator 116 with a bonding agent such as, for example, acetone or cyanoacrylate ester. The holes 112 and 114 may also be separately coated with a bonding agent although this is not usually necessary. The bonding agent such as cyanoacrylate ester works with application of pressure, such as applied from the force fit of the plastic fastener by driving it into the aligned holes 112 and 114 in the two plastic bodies. The protrusions 110 actually liquify or flow under pressure and from the breakdown thereof by the bonding agent to commingle with the plastic from bore walls 118 and 120 of the holes 112 and 114. The bonding agent also liquifies the bore walls. The commingled plastics flow together and solidify, that is, cure or harden to form a solid plastic interface between the plastic of the fastener and the plastic of the upper body and the plastic of the lower body. Thus, there will still be interface 122 between the upper and lower bodies 102 and 104 at their interior abutting faces except for that solid central portion of the plastic fastener body bridging the interface 122, and connecting the upper and lower bodies together.

Surprisingly, when cutting a cross-section through the fastener 100 and upper and lower bodies 102 and 104 after application of the bonding agent, there may be no indication of the protrusions 110 or of interface between the bore walls 118, 120 and the exterior wall 108 of the fastener. More specifically, in one example, the upper and lower bodies were flat plates of a PBT plastic sold under the trademark VALOX by General Electric Company; and the plastic fastener was also made of Valox plastic. The bonding agent used was cyanoacrylate ester. The Valox plastic of the three pieces had so intermingled that no protrusions were visible, no marks were visible as being made by the protrusions, and there was no line of demarcation between the fastener and the plates or other indications of where the exterior wall 108 of the fastener 110 had been. Also, no voids were found which would correspond to spaces 111 that existed between protrusions 110 on the plastic fastener 100.

The illustrated fastener 100 is a hollow cylinder in shape with an interior bore 124 extending the full length of the fastener body. Thus, the fastener has annular body with central hollow bore 124. The internal bore 124 may be made with a screw thread 125 to receive a metal screw to be threaded therein. The preferred protrusions are made with reverse sloping walls so that one pair of protrusions in each row resists a clockwise turning force, and the other pair of protrusions in the same row resists a counterclockwise turning force. The preferred protrusions have a flat upper side 126 that is generally horizontal and upwardly and outwardly inclined bottom side 128 to aid in driving and camming the fastener body down into the holes 112 and 114. If the bonding is achieved by heat melting of the protrusions and exterior wall, as from an ultrasonic bonding device, the protrusions may have deflected and deformed as they were driven into the bore walls and indentations may be made thereby into the bore walls 118 and 120. After application of ultrasonic heating and melting and intermixing of plastics, the protrusions and indentations are generally no longer visible when a cut is made therethrough at a later time after plastic resolidification.

To prevent a twisting in either a clockwise or counterclockwise direction, there is a flat side 129, 129a and a sloped side 130 on each protrusion with one pair of flat sides 129 being on the clockwise side of the protrusions, and the other flat sides 129a being on the counterclockwise side of another pair of protrusions in each row of protrusions. Manifestly, the protrusions 110 and the spaces 111 therebetween may have various shapes from those illustrated herein and still fall within the purview of the invention.

In some instances, it may be preferable to eliminate the interior bore of the fastener 100 and to provide a stop to limit the amount of insertion of the fastener into the upper and lower bodies. This is achieved in the embodiment of the invention illustrated in FIGS. 11 and 12, in which a plastic fastener 100a is formed as the fastener 100 described above except that a flat enlarged head 132 is integrally formed on the top of the fastener body having the protrusions 110a which are identical to the protrusions 110 described above. When force hitting the fastener 100a into holes 112a and 114a, the head may be hit with hammer blows or a steady pressure to push the lower body and protrusions into aligned holes; and when a lower side 134 of the head hits upper, outer surface of the upper body 102, the fastener 100a will be full driven and stopped against further inward travel. If desired, a bonding may also be achieved between the lower side 134 of the fastener head 132 and the top side of upper body by applying the bonding agent to the lower side of the head and forcing it under pressure against the facing plastic surface of the upper body to commingle the liquified plastics. Alternatively, an ultrasonic bonding device applied to the head can also liquify and cause a flowing together of plastic from the lower side of the head and the top, exterior surface of the upper body 102.

In some instances, it may be desired to drive the fastener into the lower body 104 and at a later time, fasten the upper body 102 thereto. For example, the lower body could be a plate to which may be fastened a number of very small components at a later time during an assembly process. The plastic fastener 100b may be used in such a process with a lower portion 140 that is driven into a bore 142 in the lower plate body 104 until a collar 144 on the plastic fastener 100b hits the top surface of the lower plate body 104. The lower portion is bonded to the lower plate body by a bonding agent or ultrasonic heating to commingle the plastic from the protrusions 146 on the lower portion, and plastic on the exterior wall of the lower body. The underside of the collar may also be bonded to the lower plate body by the bonding agent or ultrasonic mixing of the collar plastic and the top surface of the lower plate body. The protrusions and the annular body of the plastic fastener 100b may be made in the same manner and function as described above for the plastic fastener 100.

With the lower portion 140 firmly secured in the lower plate body 104, a remaining upper portion or half 150 of the plastic fastener 100b projects upwardly from the lower plate body. When it is time to fasten a component or another plate to the lower plate body 104, a hole which is formed in the component and which is sized to have a force fit with the upper portion 150 of the plastic fastener is forced over the upstanding fastener portion 150. The plastic of the upper portion 150 flows and mixes with the plastic of the wall defining the hole in component body. This flowing of the respective plastics and the mixing thereof is due either to a bonding agent such as acetone, cyanoacrylate ester or the like or an ultrasonic liquefying and mixing of plastics so that the protrusions lose their original size and shape. When the plastic hardens, the component will be securely held by the upper portion 150 of plastic fastener; and, because the lower half portion 140 is integral with the upper half portion 150 and securely fastened in the lower plate portion 104, the component body will be secured to the lower plate body 104.

If for some reason a plastic fastener, such as the plastic fastener 100 joining the upper plate body 102 to the lower plate, should fail or be severed, it can be replaced by drilling out the plastic fastener with a drill bit of a larger diameter than the plastic fastener. A new, larger diameter, plastic fastener 100 may then be force fitted into this larger drilled hole and its plastic caused to flow and mix with the plastic of the upper plate body 102 and the plastic of the lower plate body 104 which mixed plastic, when re-solidified, joins the respective upper and lower plates to the respective upper and lower portions of the plastic fastener of the larger diameter.

The force fit is desired to apply compression forces to the plastic to cause plastic flow into the spaces about the protrusions. The cyanoacrylate ester seems to liquify the plastics and cause them to flow only when under compression from the two surfaces to be joined.

What is claimed is:

1. An assembly of an insert integrally secured to a plastic base, the combination comprising:
   a recess formed in the plastic base;
   a plastic insert comprising a tubular body having a bore and outer tubular surface a discrete plurality of projections projecting from the tubular surface and spaces formed about and between said projections;
   the plastic insert fitted into the recess of the base; and
   interlocking plastic portions on the insert tubular body and on the plastic base having been flowed together and solidified from the projections and the base fitting the spaces between projections with the projections having lost their shape and identity to interlock the base and insert to one another and to secure the insert against rotation and removal from the plastic base.

2. An assembly in accordance with claim 1 wherein said projections have a base portion integrally connected to the tubular surface;

inclined walls projecting outwardly from the base portion and encircling each projection; and outer free ends on the projections having a cross-section substantially less than the cross-section of the base portions.

3. An assembly in accordance with claim 2 wherein the projections are in the shape of truncated pyramids.

4. An assembly in accordance with claim 2 wherein said projections are located in spaced rows.

5. An assembly of a plastic component integrally secured to a plastic base, the combination comprising:

a plastic base;

a plastic component comprising a body having an outer surface for attachment to the plastic base;

a plurality of discrete projections projecting from the outer surface;

the plastic projections being pointed with inclined sidewalls extending outwardly from a first cross-section at their juncture with said outer surface to a smaller cross-section at free ends on the projections to provide for rapid melting of the projections;

the projections being spaced in a predetermined array and separated by predetermined spaces therebetween; and interlocked plastic portions formed of blended and mixed plastics from the plastic base, the component and the rapidly melted, projections filling all of the predetermined spaces to interlock the plastic base and component together with the projections having lost their shape and identity and without a substantial line of demarcation in said interlocked plastic portions which secure the plastic component to the plastic base.

6. A method for fastening a plastic component to a plastic base having a recess therein, comprising the steps of:

providing a plastic component having an integral interlocking portion with a surface having a plurality of projections thereon which are formed integrally with the plastic piece and projecting outwardly from the surface with the projections being separated by spaces therebetween;

force-fitting the plastic interlocking portion of the component into the recess of the base;

bringing the plastics of the engaged plastic interlocking component and the base to a flowable state at their interface and causing flow of the respective plastics together and flowing the plastic of the projections outwardly therefrom into the spaces therebetween to lose their shape and identity and joining together the flowable plastics from the projections, interlocking component and the base to fill the spaces between projections; and bringing the flowed plastics of the component's interlocking portions and base back to their ambient, solid conditions with spaces between projections having been filled with intermixed solid plastic.

* * * * *